United States Patent [19]
Barber et al.

[11] 4,305,835
[45] Dec. 15, 1981

[54] LUBRICATING COMPOSITION CONTAINING EMULSION-SLUDGE INHIBITORS

[75] Inventors: Rodney I. Barber, Bracknell; David K. Walters, Yateley, both of England

[73] Assignee: Ethyl Corporation, Richmond, Va.

[21] Appl. No.: 214,137

[22] Filed: Dec. 8, 1980

[30] Foreign Application Priority Data

Dec. 14, 1979 [GB] United Kingdom ............... 43259/79

[51] Int. Cl.$^3$ ................................................. C10M 1/32
[52] U.S. Cl. ............................ 252/51.5 A; 252/52 A; 252/52 R
[58] Field of Search ............... 252/51.5 A, 52 A, 52 R

[56] References Cited

U.S. PATENT DOCUMENTS

| 2,979,528 | 4/1961 | Lundsted | 564/443 X |
| 3,100,230 | 8/1963 | Mansfield | 252/52 R X |
| 3,101,374 | 8/1963 | Patton, Jr. | 564/355 X |
| 3,110,736 | 11/1963 | De Groote et al. | 252/52 R X |
| 3,509,052 | 4/1970 | Murphy | 252/51.5 A X |
| 3,933,662 | 1/1976 | Lowe | 252/52 R X |
| 3,962,124 | 6/1976 | Motz et al. | 252/52 R X |

Primary Examiner—Andrew Metz
Attorney, Agent, or Firm—Donald L. Johnson; John F. Sieberth; Joseph D. Odenweller

[57] ABSTRACT

A lubricating oil composition for use in the crankcase of an internal combustion engine, having improved resistance to the formation of emulsion-sludge in the area under the engine rocker cover, which contains the combination of an oxyalkylated alkylphenol-formaldehyde condensation product and an oxyalkylated trimethylolalkane.

14 Claims, No Drawings

LUBRICATING COMPOSITION CONTAINING EMULSION-SLUDGE INHIBITORS

BACKGROUND

Modern lubricating oils used in internal combustion engines contain dispersants. These prevent the accumulation of engine sludge. However, such dispersants are surface active agents, and it has been found that their use can lead to a phenomenon called "emulsion-sludge". This occurs in overhead valve engines including overhead cam engines on the engine parts under the rocker cover. Water can accumulate in this zone especially in cold weather and combine with engine oil to form a water-oil emulsion having the consistency of mayonnaise.

SUMMARY

It has now been discovered that emulsion-sludge can be eliminated or the amount substantially reduced by including in the motor oil the combination of an oil-soluble oxyalkylated alkylphenol-formaldehyde condensation product and an oil-soluble oxyalkylated trimethylolalkane.

DESCRIPTION OF PREFERRED EMBODIMENT

Accordingly, the invention provides a lubricating oil composition comprising a major amount of lubricating oil and, as additives, (a) an oxyalkylated alkylphenol-formaldehyde condensation product and (b) an oxyalkylated trimethylolalkane.

Preferably, the oxyalkylated trimethylolalkane has a molecular weight of from 1,000 to 10,000, e.g. 3,000 to 10,000 or more preferably, 3,000 to 8,000.

Preferably, the oxyalkylated trimethylolalkane is an oxyalkylated trimethylol $C_1$ to $C_4$ alkane.

Preferably, the oxyalkylated trimethylolalkane is an oxyalkylated trimethylolethane or propane.

Preferably, the oxyalkylation in the oxyalkylated trimethylolalkane is by a mixture of propyleneoxy and ethyleneoxy groups.

Preferably, the propyleneoxy and ethyleneoxy groups are so disposed as to form relatively hydrophobic blocks of oxyalkylene groups adjacent the trimethylol group and relatively hydrophilic blocks remote from the trimethylol group.

Preferably, the said hydrophobic blocks are formed by oxyalkylating a trimethylolalkane with propylene oxide or a mixture of propylene and ethylene oxides containing not more than 41 mole percent ethylene oxide and thereafter oxyalkylating the product with ethylene oxide or a mixture of ethylene oxide and propylene oxide containing in excess of 41 mole percent of ethylene oxide to form the hydrophilic blocks.

Preferably, the hydrophilic blocks form from 5 to 90 percent by weight of the oxyalkylated trimethylolalkane.

The oxyalkylated alkylphenol-formaldehyde condensation product preferably has the formula:

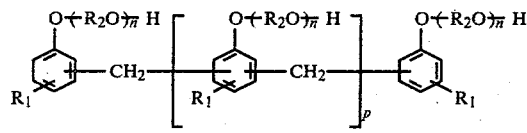

wherein $R_1$ is an alkyl group containing about 5 to 20 carbon atoms, $R_2$ is a divalent aliphatic hydrocarbon group containing 2 to 3 carbon atoms, the values of n are each integers independently selected from 1 to about 20 and p is an integer from 0 to about 20. More preferably, n is an integer from 2 to 10 and p is an integer from 7 to 12 such that the molecular weight is in the range of about 4000–6000.

In a still more preferred embodiment $R_1$ is the nonyl group. Most of the $R_1$ alkyl groups are bonded in the para position and the methylene bridges are between ortho positions. In the most preferred embodiment $R_2$ is the ethylene group —$CH_2$—$CH_2$— which is formed by oxyethylating the phenolic hydroxy groups by reaction with ethylene oxide.

Suitable oxyalkylated alkylphenol-formaldehyde condensation products are available commercially. One such preferred additive is marketed by Pierrefitte-Auby of Paris, France under the trade name "Prochinor GR77". This product is supplied as a concentrate in an aromatic solvent. The active ingredient is believed to be an ethoxylated nonylphenol-formaldehdye condensate of molecular weight 4200 (by gel permeation chromatography-calibrated with polystyrene).

The oxyalkylated trimethylolalkane preferably has the formula

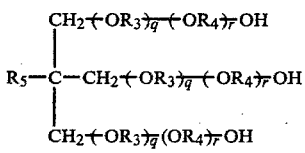

wherein $\text{-(OR}_3\text{)}_q$ represents a hydrophobic block in which $R_3$ is a divalent aliphatic group containing 2 or 3 carbon atoms derived from propylene oxide and optionally ethyleneoxide, $\text{-(OR}_4\text{)}_r$ represents a hydrophilic block in which $R_4$ is a divalent aliphatic group containing 2 or 3 carbon atoms derived from ethylene oxide and optionally propylene oxide, $R_5$ is an alkyl group containing 1–4 carbon atoms and q and r are integers.

The hydrophobic block consists essentially of propyleneoxy units but can contain up to 41 mole percent random ethyleneoxy units such that the average oxygen-to-carbon atom ratio does not exceed 0.4. For example, when $\text{-(OR}_3\text{)}_q$ are all propyleneoxy units the oxygen-to-carbon atom ratio is 0.33. When 41 mole percent of the $\text{-(OR}_3\text{)}_q$ are ethyleneoxy units, the oxygen-to-carbon atom ratio is 0.4.

The hydrophilic block consists mainly of ethyleneoxy units. Preferably, it contains at least four mole percent propyleneoxy units such that the oxygen-to-carbon ratio is in excess of 0.4. For example, when the hydrophilic block contains 4 mole percent propyleneoxy units the oxygen-to-carbon atom ratio is 0.49 and when the hydrophilic block contains 50 mole percent propyleneoxy units the oxygen-to-carbon atom ratio is 0.41. Thus, the hydrophilic block may contain up to about 50 mole percent propyleneoxy units, the remainder being ethyleneoxy units.

Each q and each r are preferably independently selected integers and are such that the molecular weight of the oxyalkylated trimethylolalkane is about 3000–10,000 and the hydrophilic block $\text{-(OR}_4\text{)}_r$ forms about 5–90 weight percent of the oxyalkylated trimethylolalkane.

In one preferred embodiment the hydrophobic block $\text{-(OR}_3\text{)}_q$ consists essentially of propyleneoxy units. In a more preferred embodiment the hydrophobic block consists essentially of about 60–95 mole percent propyleneoxy units and 5–40 mole percent ethyleneoxy units.

In a still more preferred embodiment, q is selected such that the combined molecular weight of the trimethylolalkane and hydrophobic blocks is about 1000–5000 and r is selected such that the combined molecular weight of the hydrophilic blocks is about 1000–6000 and q and r are further selected such that the average molecular weight of the oxyalkylated trimethylolalkane is about 3000–10,000.

The block oxyalkylated trimethylolalkane may be made by first reacting trimethylolalkane with propylene oxide or a mixture of propylene oxide and ethylene oxide having an oxygen-to-carbon atom ratio not in excess of 0.4. Propylene oxide has an oxygen-to-carbon atom ratio of 0.33 and ethylene oxide has an oxygen-to-carbon atom ratio of 0.5. Hence, an atom ratio of 0.33–0.4 would include propylene oxide containing from 0 to about 41 mole percent ethylene oxide. More preferably, an alkylene oxide mixture containing about 5–40 mole percent ethylene oxide and 60–95 mole percent propylene oxide is used.

In one preferred embodiment the initial condensation of the hydrophobic block is conducted until the average combined molecular weight of the trimethylolalkane and the hydrophobic blocks is about 1000–5000.

Following this the intermediate trimethylolalkane is reacted with ethylene oxide or a mixture of ethylene oxide and propylene oxide in which the mixture has an average oxygen-to-carbon atom ratio in excess of 0.4. This reaction bonds a terminal hydrophilic oxyalkylene block to the reactive end of the initial hydrophobic blocks. Mixtures used to form the hydrophilic block contain in excess of 41 mole percent ethylene oxide. Preferably, the mixture used to form the hydrophilic block contains about 4–40 mole percent propylene oxide and 60–96 mole percent ethylene oxide. The second condensation is carried out using sufficient ethylene oxide or ethylene oxide propylene oxide mixture to form hydrophilic blocks having combined about 1000–6000 average mole weight.

Most preferably, $R_5$ is an ethyl group such that the additives are oxyalkylated trimethylol propane. Preferred oxyalkylated trimethylolpropanes of this invention are known compounds. They are described in U.S. Pat. No. 3,101,374, to which the reader is directed for further details. Examples of such additives can be obtained from BASF Wyandotte Corporation under the name "Pluradot" (registered trademark). They are available in various molecular weights. Pluradot HA-510 has an average molecular weight of 4,600 and Pluradot HA-530 has an average molecular weight of about 5,300. Pluradot additives are propyleneoxylated and ethyleneoxylated trimethylolpropanes. These are very effective in the present combination.

The amount of oxyalkylated alkylphenol-formaldehyde condensation product and oxyalkylated trimethylolalkane added to the lubricating oil should preferably be an amount which is effective in eliminating or substantially reducing the quantity of emulsion sludge when the composition is used as crankcase oil. A useful concentration of oxyalkylated alkylphenol-formaldehyde condensate is about 0.005–0.3 weight percent, more preferably about 0.025–0.25 weight percent on an active ingredient basis. Still more preferably, the concentration is 0.05–0.15 weight percent. A useful concentration of oxyalkylated trimethylolalkane is about 0.001–0.3 weight percent, more preferably about 0.005–0.05 weight percent.

The additive mixture can be used in both mineral oil and synthetic oil or blends of mineral oil and synthetic oil. Synthetic oil includes olefin oligomer. These are readily made by the Friedel-Crafts (e.g., $BF_3$—$H_2O$) oligomerization of $C_{6-14}$ α-olefin. An especially useful olefin oligomer is that made by oligomerizing α-decene followed by removal of monomer and dimer and hydrogenation of the residual product.

Another useful class of synthetic oils are the alkylated benzenes. An example of this class is didodecylbenzene. Synthetic ester lubricants are also very useful. These include monesters, diesters, complex esters and hindered esters. Examples of these are dinonyl adipate, trimethylolpropane tripelargonate and the like.

Blends of about 5–20 percent α-decene trimer with 150 SUS mineral oil form a very useful base lubricant. Likewise, blends of synthetic esters with α-olefin oligomers or alkylated benzenes are useful.

Co-additives are included in the fully formulated crankcase lubricant. Examples of these are dispersants such as the polyisobutenyl succinimide of ethylenepolyamine and polyisobutylphenol Mannich condensates with formaldehyde and ethylenepolyamine. Metal detergents such as calcium alkylbenzene sulfonate, magnesium petroleum sulfonate, calcium salicylates, calcium alkylphenates and sulfurized phenates are conventionally included.

Viscosity index improvers are generally added to improve the viscosity property of the formulated oil. These include the polyalkyl-methacrylate type and the olefin copolymer type. Examples of the latter are ethylene-propylene copolymer, styrene-butadiene copolymer and the like. Dispersant type VI improvers can also be used such as alkyl methacrylate/N-vinyl pyrrolidone (NVP) copolymers.

Phosphosulfurized olefins can be added such as phosphosulfurized terpenes or phosphosulfurized polybutenes. These may be further reacted by steam blowing or by neutralization with alkaline earth metal bases such as barium oxide.

Phenolic antioxidants are frequently added to the oil compositions. Examples of these are 4,4'-methylenebis-(2,6-di-tert-butylphenol), 2,6-di-tert-butyl-4-dimethyl aminomethylphenol, 4,4'-thiobis-(2,6-di-tert-butylphenol) and the like.

Zinc salts of dihydrocarbyldithiophosphoric acid are routinely added to provide both wear and antioxidant protection. A typical example is zinc di-(2-ethylhexyl)-dithiophosphate.

The emulsion sludge problem is most likely to occur in formulated motor oil of the high dispersancy type. By this is meant oils which have the dispersancy required to qualify for API (American Petroleum Institute) classification SE or SF as determined by passing the ASTM Sequence VC or VD test procedure.

Motor oils that pass the VC or VD Sequence tests are often formulated to contain a dispersant type viscosity index improver such as an alkyl-methacrylate/N-vinyl-pyrrolidone-copolymer. Such high dispersancy can also be obtained by including in the formulated oil an alkenylsuccinic type ashless dispersant. These are made by reacting a polyolefin, (e.g. polyisobutylene) of about 900–5000 molecular weight with maleic anhydride to form an alkenylsuccinic anhydride which is reacted with an amine (e.g. polyalkylenepolyamine such as tetraethylenepentamine). Suitable ashless dispersants are described in U.S. Pat. No. 3,172,892 and U.S. Pat. No. 3,219,666 among others.

Accordingly, a further preferred embodiment of this invention is a lubricating oil formulated to have the dispersancy required to qualify for API classification SE or SF as determined by passing the ASTM Sequence VC or VD test procedure which contains an emulsion-sludge inhibiting amount of the combination of an oxyalkylated alkylphenol-formaldehyde condensation product and an oxyalkylated trimethylolalkane as previously described. Test VC is appropriate only for API Classification SE but Test VD may be used for SE or SF.

A further embodiment is such an SE or SF oil which contains a dispersant type viscosity index improver such as an alkylmethacrylate/N-vinylpyrrolidone copolymer.

A still further embodiment is such an SE or SF oil which contains at least 1.5 weight percent, more preferably, at least 2.5 weight percent of an alkenylsuccinimide type ashless dispersant measured as active ingredient.

In many cases the additive combination of this invention is first packaged in an additive concentrate formulated for addition to lubricating oil. These concentrates contain conventional additives such as those listed above in addition to the oxyalkylated trimethylolalkane and ethoxylated alkylphenol-formaldehyde condensate described herein. The various additives are present in a proper ratio such that when a quantity of the concentrate is added to lubricating oil the various additives are all present in the proper concentration. The additive concentrate also contains a diluent such as mineral oil in order to maintain it in liquid form.

The following examples illustrate the preparation of typical additive concentrates and of typical formulated oils therefrom suitable for use in an engine crankcase.

EXAMPLE 1

Zinc dialkyl dithiophosphate (60.0 lbs), Pluradot HA 510 (2.5 lbs), Prochinor GR 77 (7.5 lbs), a neutral calcium sulfonate (50 lbs), an overbased calcium sulfonate, TBN 300 (75 lbs) and a commercial polyisobutenyl succinimide dispersant concentrate (250 lbs) (40-60 percent active) were compounded in that order to form an additive concentrate. The additive concentrate was dissolved in a solution consisting of an olefin copolymer viscosity index improver (725 lbs) in a 100 VI 150SN mineral oil (3830 lbs).

EXAMPLE 2

Zinc dialkyl dithiophosphate (60 lbs), Pluradot HA 530 (1 lb), Prochinor GR 77 (7.0 lbs), a neutral calcium sulfonate (50 lbs), an overbased calcium sulfonate (75 lbs) and a commercial polyisobutenyl succinimide dispersant concentrate (100 lbs) were compounded in that order to form an additive concentrate. The additive concentrate was dissolved in a solution of an alkyl methacrylate/N-vinylpyrrolidone copolymer dispersant type viscosity index improver (450 lbs) in a 150 SN mineral oil (4257 lbs).

Engine tests were carried out which demonstrate the reduction in emulsion-sludge provided by the present additive combination. In the test an oil blend was used which contained a commercial succinimide ashless dispersant, a zinc dialkyl-dithiophosphate, an alkylmethacrylate/N-vinyl pyrrolidone copolymer VI improver, a 300 TBN overbased calcium alkylbenzene sulfonate and a neutral calcium alkylbenzene sulfonate.

The engine used was a 4-cylinder Ford Cortina with an 8.3:1 compression ratio built as described in CEC method L-03-A-70, modified in that the oil sump and rocker cover were jacketed to provide water cooling. A condenser was fitted into the oil fill opening and the crankcase breather was blocked off. After the engine was cleaned by running with a flushing oil, the test oil was placed in the crankcase. The engine was operated for 16 hours at 2750 rpm. The rocker cover was then removed and rated for quantity of emulsion sludge using the CRC rating system on a scale from −3.9 to 10 (10=clean).

The following results were obtained:

| Additive | Conc. | Rating |
|---|---|---|
| none | — | 3.1 |
| Pluradot HA 530 | 0.03 | 3.3 |
| Prochinor GR 77 | 0.15 | 6.5 |
| Pluradot HA 530 | 0.02 | ⎫ |
|  |  | 8.1 |
| Prochinor GR 77 | 0.15 | ⎭ |

These results show that the oxyalkylated trimethylolalkane (Pluradot HA 530) used alone gives very little improvement in emulsion sludge rating.

However, when used in combination with oxyalkylated alkylphenol-formaldehyde condensate (Prochinor GR 77) it gave a very significant improvement.

We claim:

1. A lubricating oil composition comprising a major amount of lubricating oil and a minor emulsion-sludge inhibiting amount of the combination of (a) an oxyalkylated alkylphenol-formaldehyde condensation product and (b) an oxyalkylated trimethylol $C_{1-4}$ alkane.

2. A composition of claim 1 wherein said oxyalkylated trimethylol $C_{1-4}$ alkane has a molecular weight of 1000–10,000.

3. A composition of claim 2 wherein said oxyalkylated trimethylol $C_{1-4}$ alkane is an oxyalkylated trimethylolpropane or oxyalkylated trimethylolethane.

4. A composition of claim 1 wherein said oxyalkylated alkylphenol-formaldehyde condensation product has the structure

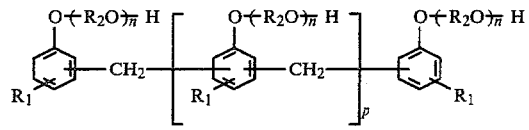

wherein $R_1$ is an alkyl group containing about 5–20 carbon atoms, $R_2$ is a divalent aliphatic hydrocarbon group containing 2–3 carbon atoms, the values of n are each integers independently selected from 1 to about 20 and p is an integer from 0 to about 20.

5. A composition of claim 4 wherein n is an integer from 2 to 10 and p is an integer from 7 to 12.

6. A composition of claim 5 wherein $R_2$ is the ethylene group, $-CH_2CH_2-$.

7. A composition of claim 6 wherein $R_1$ is the nonyl group.

8. A composition of claim 4 wherein said oxyalkylated trimethylol $C_{1-4}$ alkane has the structure

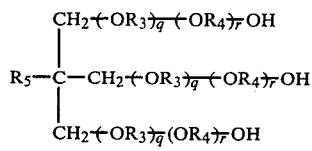

wherein $-(OR_3)-$ represents a hydrophobic block in which $R_3$ is a divalent aliphatic group containing 2 or 3 carbon atoms such that the average oxygen/carbon atom ratio in said hydrophobic block is from 0.33 to 0.4 and $-(OR_4)-$ represents a hydrophylic block in which $R_4$ is a divalent aliphatic group containing 2 or 3 carbon atoms and that the average oxygen/carbon atom ratio in said hydrophylic block is 0.41 to 0.5 and q and r are integers.

9. A composition of claim 8 wherein said hydrophobic blocks, $-(OR_3)-$, are formed by oxyalkylating a trimethylolalkane with an alkylene oxide mixture consisting essentially of 5-40 mole percent ethylene oxide and 60-95 mole percent propylene oxide and in an amount such that the average combined molecular weight of said trimethylolalkane and said hydrophobic blocks are about 1000-5000 and wherein said hydrophylic blocks $-(OR_4)-$ are formed by subsequently oxyalkylating with an alkylene oxide mixture consisting essentially of 4-40 mole percent propylene oxide and 60-96 mole percent ethylene oxide in an amount such that the average combined molecular weight of said hydrophylic blocks is about 1000-6000.

10. A composition of claim 9 wherein $R_5$ is an ethyl group and q and r are selected such that the average molecular weight of said oxyalkylated trimethylolalkane is about 3000-10,000.

11. A composition of claim 9 wherein n is an integer from 2-10 and p is an integer from 7-12.

12. A composition of claim 11 wherein $R_5$ is an ethyl group, q and r are selected such that the average molecular weight of said oxyalkylated trimethylolalkane is 3000-10,000 and $R_2$ is the ethylene group, $-CH_2CH_2-$.

13. A composition of claim 1 further containing an alkenyl succinimide ashless dispersant.

14. An additive concentrate adapted for addition to lubricating oil to provide a formulated lubricating oil suitable for use in the crankcase of an internal combustion engine, said concentrate containing an amount sufficient to inhibit emulsion-sludge when said formulated lubricating oil is used in said engine, of (a) an oxyalkylated alkylphenol-formaldehyde condensation product and (b) an oxyalkylated trimethylol $C_{1-4}$ alkane.

* * * * *

UNITED STATES PATENT AND TRADEMARK OFFICE
CERTIFICATE OF CORRECTION

PATENT NO. : 4,305,835
DATED : December 15, 1981
INVENTOR(S) : Rodney I. Barber et al It is certified that error appears in the above-identified patent and that said Letters Patent are hereby corrected as shown below:

Cover page: "(73) Assignee: Ethyl Corporation
Richmond, Va."

should be

-- (73) Assignee: Edwin Cooper and Company
Limited
Bracknell, England --

Signed and Sealed this

Twenty-seventh Day of July 1982

[SEAL]

Attest:

Attesting Officer

GERALD J. MOSSINGHOFF

Commissioner of Patents and Trademarks